United States Patent [19]

Wang et al.

[11] Patent Number: 5,446,280

[45] Date of Patent: Aug. 29, 1995

[54] SPLIT-SPECTRUM SELF-REFERENCED FIBER OPTIC SENSOR

[75] Inventors: Anbo Wang, Blacksburg; Kent A. Murphy, Roanoke; Richard O. Claus, Christiansburg, all of Va.

[73] Assignees: Center for Innovative Technology, Herndon; Virginia Polytechnic Institute and State University; Virginia Tech Intellectual Properties, Inc., both of Blacksburg, all of Va.

[21] Appl. No.: 114,511

[22] Filed: Aug. 31, 1993

[51] Int. Cl.$^6$ .......................... H01J 5/16; H01J 40/14
[52] U.S. Cl. ........................ 250/227.23; 350/227.18
[58] Field of Search .................. 250/227.18, 227.23, 250/227.19, 227.27, 226; 356/351, 352, 345; 385/12

[56] References Cited

U.S. PATENT DOCUMENTS

| | | | |
|---|---|---|---|
| 4,355,910 | 10/1982 | Quick | 374/162 |
| 4,356,396 | 10/1982 | Ruell | 250/227.23 |
| 4,659,923 | 4/1987 | Hicks | 250/227.19 |
| 5,001,338 | 3/1991 | Boero | 250/227.23 |
| 5,275,053 | 1/1994 | Wlodarczyk | 250/227.14 |
| 5,345,519 | 9/1994 | Lu | 250/227.18 |

FOREIGN PATENT DOCUMENTS

| | | | |
|---|---|---|---|
| 2150722 | 6/1990 | Japan | 250/227.18 |
| 2197946 | 6/1988 | United Kingdom | 250/227.18 |

OTHER PUBLICATIONS

"Loss Compensation Technique Using a Split-Spectrum Approach for Optical Fiber Air-gap Intensity-based Sensors"; Anbo Wang et al.; Sep. 9, 1992; Society of Photo-optical Instrumentation Engineers; Boston, Massachusetts; Fiber & Electro-Optics Research Center, Bradley Department of Electrical Engineering, VPI, Blacksburg, Virginia.

*Primary Examiner*—William L. Sikes
*Assistant Examiner*—Tiep H. Nguyen
*Attorney, Agent, or Firm*—Whitham, Curtis, Whitham & McGinn

[57] ABSTRACT

A fiber optic sensor is fully compensated for light source intensity variation, fiber losses and modal power distribution by providing input to one end of an optical fiber from a relatively broad band light source containing at least two spectrally separated wavelengths. At least one of these spectrally separated wavelengths is reflected back into the optical fiber by a filter located between a second end of the optical fiber and a reflective transducer. The filter is preferably of the interference edge filter type and has a nominal cut-off wavelength within the spectral band of the light source or between the two spectrally separated wavelengths. Therefore, the paths traversed by light of the spectrally separated wavelengths will differ only by twice traversing the reflective transducer. Temperature measurement or compensation can also be provided by sensing of reflected light intensity or power at approximately the nominal cut-off frequency of the filter. Reflective transducers of both the intensity-based and interferometric types are usable with the invention.

8 Claims, 1 Drawing Sheet

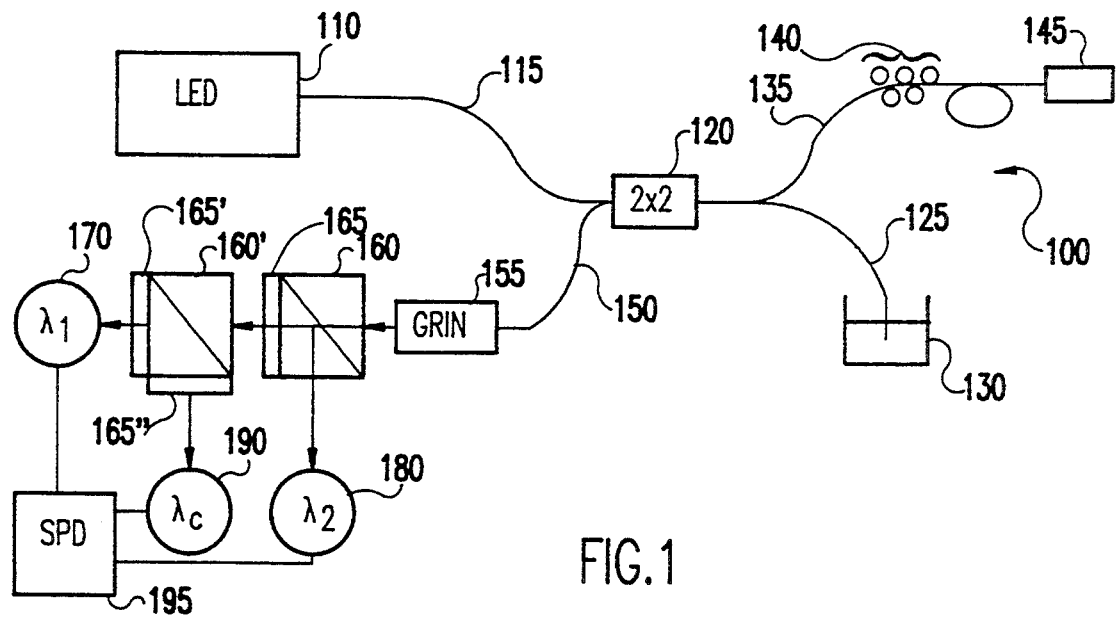
FIG.1
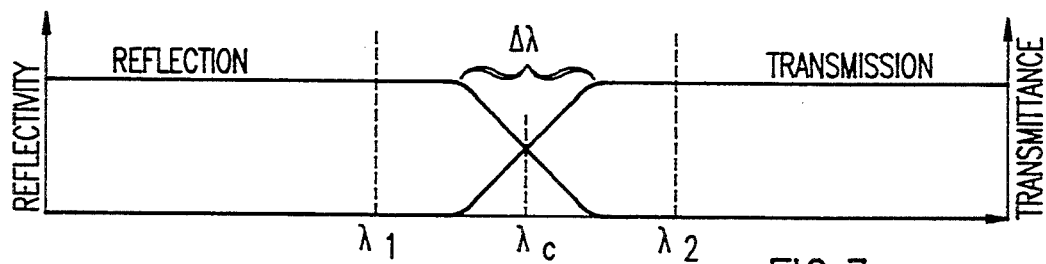
FIG.3
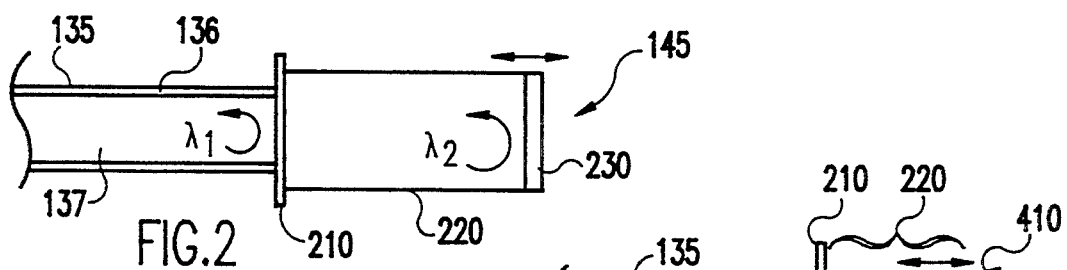
FIG.2
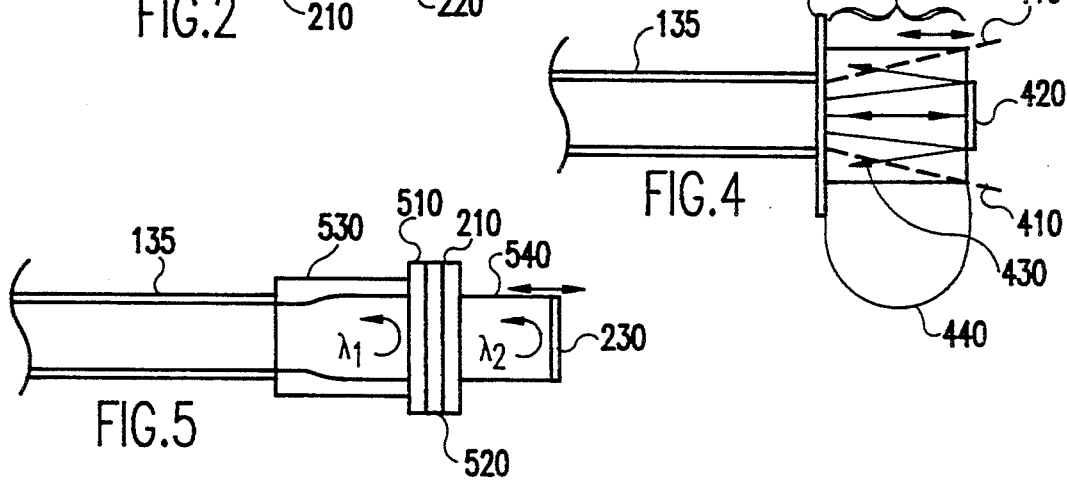
FIG.4
FIG.5

SPLIT-SPECTRUM SELF-REFERENCED FIBER OPTIC SENSOR

BACKGROUND OF THE INVENTION

1. Field of the Invention

The present invention generally relates to transducers for the measurement of physical quantities and, more particularly, to optical sensors including an optical fiber communication link.

2. Description of the Prior Art

Many types of machinery and systems benefit from or rely upon monitoring of conditions at various locations therein or in the environment in which such systems are operated. For example, many manufacturing processes in chemical and metallurgical fields, such as semiconductor manufacturing, require precise control of temperature, pressure, position or any number of other physical conditions, often in hostile environments. Automatic control systems, such as heating and air-conditioning systems also require similar monitoring of physical conditions, often at a large number of spatially distributed locations. Whatever the application, sensor size is often critical in avoiding interference with the process being monitored. In recent years, fiber optic sensors have often been used to meet these requirements since fiber optic sensors are characteristically immune from electromagnetic interference and exhibit high accuracy, geometric flexibility, durability and small size.

Fiber optic sensors for high accuracy measurement generally rely on the sensing of a change of dimension in response to the physical condition being measured. While such sensors may have a variety of forms, they may generally be grouped into two categories: intensity-based sensors and interferometric sensors. Interferometric sensors measure differential phase changes in multipath optical geometries and provide extremely good stability and high resolution of measurement. However, complex signal processing is often required to accomplish signal recovery. Intensity-based sensors, by comparison, have somewhat lower resolution but require only simple signal processing such as for calibration and/or linearization of output light intensity (or power).

Both of these categories of fiber optic sensors return information from the transducer location as changes in intensity or power of light or other radiation generally extending from the infrared to ultraviolet wavelength range. Therefore, attenuation attributable to the fiber optic communication link, modal power distribution and variation in intensity of the input illumination are sources of potential error or drift over time of the measurement being made and may be interpreted as changes in the measurand. For this reason, considerable effort has been expended on various compensation techniques to reduce variation and drift in fiber optic measurement arrangements. However, while these techniques can provide some degree of compensation for variations of fiber loss or input power, variations in temperature of the sensor (when the sensor is used to measure other physical parameters) may cause additional variation in response.

Since this further source of measurement variation originates with the sensor or transducer, itself, the variation cannot be compensated without an independent temperature measurement, which has required a further, independent temperature measurement system. Provision of such a further system potentially compromises most of the benefits of size and installation flexibility characteristic of fiber optic sensors. Further, it may be difficult to obtain a reliable measurement of temperature of one sensor with an independent temperature sensor while maintaining the independent temperature sensor free from the physical effects which the one sensor is intended to measure.

SUMMARY OF THE INVENTION

It is therefore an object of the present invention to provide a fiber optic sensor which is self-referenced for compensation of fiber losses and input light intensity variation.

It is another object of the invention to provide a fiber optic sensor which is self-referenced for variation of measurement due to changes in temperature of the sensor.

It is a further object of the invention to provide a self-referencing structure for a fiber optic sensor which is applicable to both intensity-based and interferometric sensors.

It is yet another object of the invention to provide both interferometric and intensity-based fiber optic sensors which are self-referenced for variations in source intensity or power, fiber losses and temperature.

In order to accomplish these and other objects of the invention, a fiber optic sensor is provided including a transducer, a source of light including at least two spectrally separated wavelengths, a length of optical fiber for coupling light from the light source to the transducer, a filter interposed between the optical fiber and the transducer having a nominal cut-off wavelength between the spectrally separated wavelengths, and an arrangement for sensing and comparing light intensity at each of the at least two spectrally separated wavelengths.

In accordance with another aspect of the invention, a method is provided for compensating a fiber optic sensor for variation of input light, fiber losses and modal power distribution comprising the steps of inputting light having at least two spectrally separated wavelengths into a first end of an optical fiber, filtering light at a cut-off frequency between the spectrally separated wavelengths at a second end of the optical fiber to reflect light of at least one of the spectrally separated wavelengths into said optical fiber and sensing and comparing relative intensities of reflected light at the spectrally separated wavelengths.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is a schematic diagram of the fiber optic sensor arrangement in accordance with the invention, FIG. 2 is an enlarged view of the transducer of FIG. 1, FIG. 3 is a transmission/reflectance diagram useful for explaining the operation of the sensor arrangement of FIG. 1, FIG. 4 is an illustration of an intensity based transducer in accordance with the invention, and FIG. 5 is an illustration of an interferometric transducer in accordance with the invention.

DETAILED DESCRIPTION OF A PREFERRED EMBODIMENT OF THE INVENTION

Referring now to the drawings, and more particularly to FIG. 1, there is shown, in schematic form, a measurement arrangement 100 including a self-referenced fiber optic sensor in accordance with the invention. The output of a light source 110, such as a light-emitting diode (LED) is coupled into a first end of multi-mode optical fiber 115 which is connected at its other end to a 2×2 coupler 120. (Optionally, a single mode fiber could be used to decrease modal power distribution dependence.) The light source 110 should be relatively broad band rather than monochromatic so that the wavelengths of radiation therefrom will contain spectrally separated wavelengths which can be discriminated by a filter which will be described below. An LED has a sufficiently broad band of radiation output for the relatively sharp cut-off characteristic of an interference edge filter or dichroic filter (or mirror) which are preferred and readily available. However, in principle, other types of filters can be used and the input light could be provided by a source of white light or several spectrally separated peaks. Alternatively, light from several LEDs or other light sources could be combined in a manner well-understood in the art as long as relative intensity or power can be maintained.

Coupler 120 divides the input light between two output fibers 125 and 135. Fiber 125 is preferably terminated with an index matching gel or other means to prevent reflection but is otherwise unimportant to the practice of the invention. The signal coupled to fiber 135 is preferably passed through a mode scrambler 140 (if a multi-mode fiber is used) to ensure even modal power distribution in the fiber and then to sensor 145; the important elements of which are shown in FIG. 2. Mode scrambler 140 is not strictly necessary to the practice of the invention but is believed to improve accuracy and uniformity of performance.

Optical fiber 135 which is preferably of a type including a core 137 and cladding 136 for producing so-called total internal reflection (TIR) is terminated with a filter 210 which may be of either a low-pass or high-pass type at least for a significant portion of the spectrum of light source 110. Filters having a relatively sharp cut-off characteristic at a nominal cut-off wavelength are preferred since the light source can be very much simplified if the sloped region of the filter characteristic, $\Delta\lambda$ in FIG. 3, is narrower than the spectrum of the light source. Since this is true for interference edge filters and dichroic filters or mirrors and the spectral output of LEDs (which also have an extremely stable spectrum even though light intensity or power for a given input current may drift over time), this combination of filter structure and light source are preferred. The characteristics of the filter are otherwise unimportant to the principles and practice of the invention.

The function of filter 210 is to reflect light of a first wavelength, $\lambda_1$, back through optical fiber 135 while passing light of a second wavelength, $\lambda_2$, into a measurement cavity 220 of transducer 145 which is subject to change in optical properties or path length in response to the physical parameter to be measured and which is terminated by a mirror, such as a silvered surface. It should also be understood that the measurement cavity 220 need not be a physical device but could be simply a distance through an atmosphere, vacuum or fluid to a reflecting surface, as would be the case if a displacement were being measured. After passing through cavity 220, light of wavelength $\lambda_2$ is reflected from a mirror which may or may not be wavelength selective (e.g. a filter having a characteristic complementary to that of filter 210) and again traverses cavity 220, increasing the sensitivity of the measurement, and passes through filter 210 and back into fiber 135.

Light of both wavelengths again passes through mode scrambler 140, if used, and into coupler 120 where the returned signal is divided and a portion coupled into optical fiber 150. The light in fiber 150 is preferably collimated by a graded index of refraction (GRIN) lens 155 and into a beam splitter 160 to separate the wavelengths. A further narrow band-pass filter 165 may be provided for either or both wavelengths to restrict the wavelengths to which sensors 170 and 180 can respond but is not necessary to the practice of the invention. In accordance with a temperature compensation feature of the present invention, a second beam splitter may also be used to separate a third wavelength of returned light, as will be discussed below. If one or more narrow band-pass filters are used, they should be located between the light sensor and the beam splitter which immediately precedes the light sensor for that wavelength which is to be sensed, as shown at 165'.

Thus it can be seen from FIGS. 1–3 that if the measurement is derived from a difference, ratio or other computation from the intensities of light at $\lambda_1$ and $\lambda_2$, any variation caused by variation of intensity of light source 110 or losses in the optical fiber will be completely compensated. Both wavelengths traverse precisely the same optical fiber path and differ only by the passage of one wavelength twice traversing the transducer measurement cavity 220 and filter 210. Thus any attenuation of intensity or power in the fiber or variation in the light source output will be common to both wavelengths.

As an added benefit of the present invention, the temperature of the sensor or transducer 145 can also be directly measured by sensing the returned light intensity or power at a third wavelength in much the same manner as that disclosed in U.S. patent application Ser. No. 08/023,903, filed Feb. 23, 1993, and fully incorporated by reference herein. Essentially, an interference edge filter is comprised by a plurality of very thin layers forming a plurality of equally spaced, partially reflective interfaces. Interference effects vary with the relationship of light wavelength to the spacing of the interfaces. Since the spacing of the interfaces and the refractive indices of each layer will change slightly with temperature, the nominal cut-off wavelength will also shift slightly with temperature.

Therefore, if returned light intensity or power is monitored at a wavelength $\lambda_c$ near the center of $\Delta\lambda$, (e.g. at approximately the nominal cut-off wavelength of the filter 210) the relative intensity or power of light at $\lambda_c$ to the intensity at $\lambda_1$ will be a direct measure of temperature. It should be noted that the filter 210 is preferably adjacent or in contact with the measurement cavity 220 and thus is in good thermal communication therewith. The filter is also unlikely to be affected by any physical effect other than temperature to which the measurement cavity is exposed and no isolation is required. Further, the temperature measurement also is fully compensated for fiber losses, modal power distribution and light source intensity variation by using the same optical path for both wavelengths involved in the temperature measurement.

Thus compensation for temperature variation may be provided or, alternatively, temperature may be directly read out as a second measurement by using a light intensity ratio or other calculation to access a look-up table (LUT). The only additional structure required is a second beam splitter, one additional transducer, an output filter (e.g. 165"), if desired, and a calculation arrangement and look-up table to provide output temperature or compensation values. Thus, this form of temperature measurement arrangement in accordance with the system does not require an independent measurement system or isolation and is of improved performance since thermal communication is as direct as possible.

It should be noted from the foregoing that the only constraint on the sensor structure which is needed to provide split-spectrum self-referencing compensation in accordance with the invention is a high-pass or low-pass filter generally adjacent the measurement cavity. In fact, the principles of the invention would also apply to a filter located elsewhere in the optical fiber path but, in this latter case, the portion of the fiber path between the filter and the transducer would be uncompensated, which may be tolerable in some cases. Therefore, there is wide latitude in the types of transducers to which the invention may be applied including both interferometric and intensity-based types of transducers. Two preferred forms of transducer will now be discussed in connection with FIGS. 4 and 5.

An intensity-based sensor is shown in FIG. 4 of a type described in "Loss Compensation Technique Using a Split-Spectrum Approach for Optical Fiber Air-gap Intensity-based Sensors" by Anbo Wang et al. presented Sep. 9, 1992, at a conference of the Society of Photo-optical Instrumentation Engineers, Fiber Optic and Laser Section X, Sep. 6–9, 1992, at Boston, Mass. and which is hereby fully incorporated in this specification by reference. As in the basic sensor of FIG. 2, the optical fiber 135 is terminated by filter 210. The measurement cavity 220 is defined by the separation of a reflector 420 which may simply be a surface of an object but is preferable a silvered surface forming a mirror. There is no constraint on the material between the filter 210 and the reflector 420 and could even be a vacuum.

Light of wavelengths passed by filter 210 is not collimated and emerges from the optical fiber 135 and filter 210 in a cone indicated by dashed lines 410. Reflection back to fiber 135 therefore imposes an aperture on this cone which reduces or attenuates the amount of reflected light which re-enters fiber 135 with increasing length of the measurement cavity. That is, light near the periphery of the cone is not reflected to a location at filter 210 which falls within the boundary of optical fiber 135. Optionally, if it is not feasible to provide a reflector 420 which is specularly reflecting but may diffuse light to a significant degree, an aperture may be imposed on the cone by limiting the diameter of the reflector (e.g. to the diameter of the fiber). This may also be useful if the measurement cavity length is very short.

The performance of such a transducer is theoretically described in the same manner as a single fiber coupler including an air gap and such analyses, which specifically determine the dimensions of the light output cone based on the refractive indices of the medium in the measurement cavity, are fully set out in the above-incorporated article. It has been verified experimentally that the performance of this type of detector agrees well with such a theoretical model. Using an LED light source having a central wavelength of 820 nm and a spectral width of 12 nm (a spectral width of 20-30 nm being somewhat more typical for LED's), a resolution of 0.007 $\mu$m has been achieved over a range of 0–254 $\mu$m.

It should be noted that this measurement of distance variation can be readily adapted to measure other physical quantities and parameters. For example, to measure temperature, the position of reflector 420 could be varied by mounting the mirror with a bimetallic strip 440 which is distorted by temperature change.

FIG. 5 shows a preferred form of interferometric sensor which can also be used in accordance with the principles of the invention. As in FIG. 2, this sensor includes a filter 210. However, a polarizer 510 and a wave plate 520 are also included adjacent filter 210. Also, since this type of transducer does not rely on an effective aperture, a lens 530, preferably in the form of a graded index of refraction (GRIN) lens, is provided to collimate light output from fiber 135 and to collect reflected light.

Preferably, the measurement cavity is formed of a birefringent material and is terminated by a mirror preferably formed as a silvered surface thereon. The birefringent material will exhibit different propagation velocities of light therethrough along so-called fast and slow axes. The polarizer is therefore preferably oriented at an intermediate angle (e.g. 45°) between the fast and slow propagation axes of the birefringent material. When light is reflected by the mirror 230 and passes through the polarizer 510 for a second time, the relative phase delay of the polarized light components is converted into an intensity. That is, relative phase difference has a linear correlation with intensity which is coupled back into optical fiber 135. Therefore, changes in length of the birefringent measurement cavity due to temperature, applied force and the like can be directly measured. It should also be noted that other physical effects such as photoelasticity, Faraday effect and other electrooptical effects may be employed to measure a wide variety of physical parameters, such as magnetic field, pressure, electric field, etc.

In view of the foregoing, it is seen that both intensity-based and interferometric types of fiber optic sensors have been provided which are inherently fully compensated for fiber losses, modal power distribution variation and source light intensity variation. These sensors may also be temperature compensated with little additional structure, with improved thermal coupling to the sensor and without need to isolate a second temperature sensor from physical parameters to which a primary sensor is exposed.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A fiber optic sensor including
   a source of light including at least two spectrally separated wavelengths,
   a length of optical fiber for coupling light from said light source to said transducer,
   a filter interposed between said optical fiber and said transducer having a predetermined nominal cut-off wavelength between said at least two spectrally separated wavelengths, means for sensing and comparing light intensity at each of said at least two spectrally separated wavelengths, and means for sensing light intensity at said predetermined nominal cut-off wavelength and comparing said light intensity at said predetermined nominal cut-off wavelength to one of said at least two spectrally separated wavelengths.

2. A fiber optic sensor as recited in claim 1, wherein said transducer comprises a measurement cavity terminated by a reflector.

3. A fiber optic sensor as recited in claim 2, wherein said transducer further includes an aperture which attenuates return of light returned by said reflector as a function of a length of said measurement cavity.

4. A fiber optic sensor as recited in claim 2, wherein said measurement cavity includes a body of birefringent material having angularly spaced fast and slow axes of light propagation and a light polarizing means interposed between said optical fiber and said transducer for polarizing light output from said optical fiber at an angle between said angularly spaced fast and slow axes of light propagation of said birefringent material.

5. A method for compensating a fiber optic sensor for variation of input light, fiber losses and modal power distribution comprising the steps of inputting light having at least two spectrally separated wavelengths into a first end of an optical fiber, filtering said light at a cut-off wavelength between said at least two spectrally separated wavelengths at a second end of said optical fiber to reflect light of at least one of said spectrally separated wavelengths into said optical fiber and to prevent light of said at least one of said wavelengths from being propagated to and reflecting by a transducer, sensing and comparing relative intensities of reflected light at said at least two spectrally separated wavelengths, and sensing intensity of reflected light at a predetermined nominal wavelength which approximately said cut-off wavelength, and comparing said intensity of reflected light at said predetermined nominal wavelength to intensity of reflected light at one of said at least two spectrally separated wavelengths.

6. A method recited in claim 5, wherein said comparing step includes comparing said intensity of reflected light at approximately said nominal cut-off wavelength to intensity of reflected light at two of said at least two spectrally separated wavelengths.

7. A fiber optic sensor including
a transducer,
a source of light including at least two spectrally separated wavelengths,
a length of optical fiber for coupling light from said light source to said transducer,
a filter interposed between said optical fiber and said transducer having a predetermined nominal cut-off wavelength between said at least two spectrally separated wavelengths,
means for sensing and comparing light intensity at each of said at least two spectrally separated wavelengths,
wherein said transducer comprises a measurement cavity terminated by a reflector, and wherein said transducer further includes an aperture which attenuates return of light returned by said reflector as a function of a length of said measurement cavity.

8. A fiber optic sensor including
a transducer,
a source of light including at least two spectrally separated wavelengths,
a length of optical fiber for coupling light from said light source to said transducer,
a filter interposed between said optical fiber and said transducer having a predetermined nominal cut-off wavelength between said at least two spectrally separated wavelengths,
means for sensing and comparing light intensity at each of said at least two spectrally separated wavelengths, and
means for sensing light intensity at said predetermined nominal cut-off wavelength and comparing said light intensity at said predetermined nominal cut-off wavelength to one of said at least two spectrally separated wavelengths,
wherein said transducer comprises a measurement cavity terminated by a reflector, and wherein said transducer further includes an aperture which attenuates return of light returned by said reflector as a function of a length of said measurement cavity.

* * * * *